No. 706,104. Patented Aug. 5, 1902.
E. J. PIGGOTT.
CHEESE HOOP.
(Application filed Feb. 24, 1902.)
(No Model.)
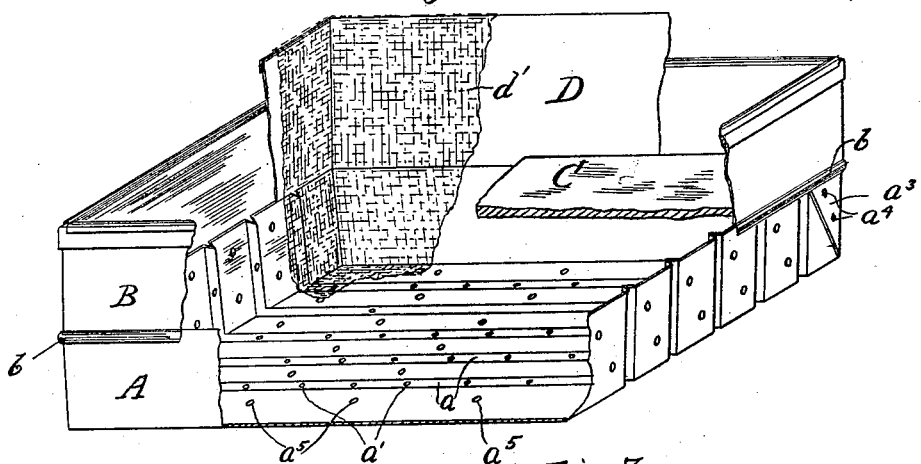
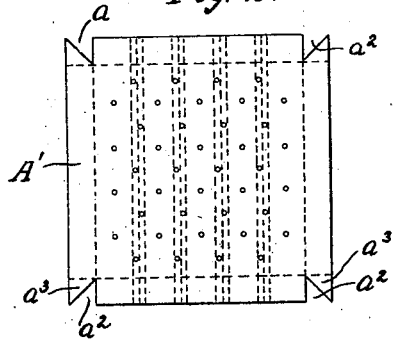
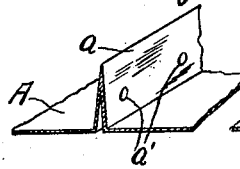
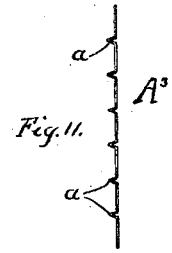
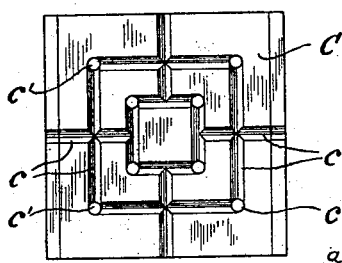
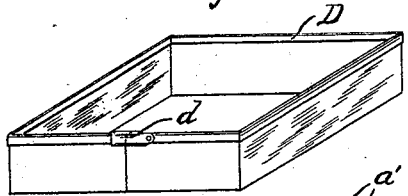
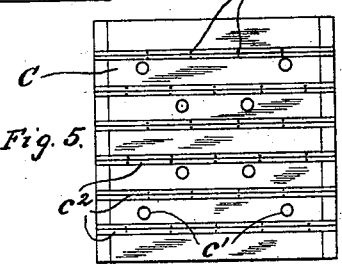
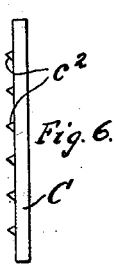
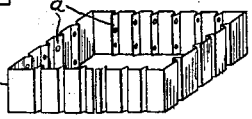
Witnesses
Otto E. Johnson
A. Gustafson
Inventor
Edward J. Piggott
By Chas. C. Tillman
Att'y

UNITED STATES PATENT OFFICE.

EDWARD J. PIGGOTT, OF CHICAGO, ILLINOIS.

CHEESE-HOOP.

SPECIFICATION forming part of Letters Patent No. 706,104, dated August 5, 1902.

Application filed February 24, 1902. Serial No. 95,220. (No model.)

*To all whom it may concern:*

Be it known that I, EDWARD J. PIGGOTT, a citizen of the United States, residing at Chicago, in the county of Cook and State of Illinois, have invented certain new and useful Improvements in Cheese-Hoops, of which the following is a specification.

This invention relates to certain new and useful improvements in hoops or molds employed for giving form to cheeses, and while it is more especially adapted to that class of cheese-hoops used in connection with a gang-press, yet it is applicable to other kinds of hoops; and it consists in certain peculiarities of the construction, novel arrangement, and operation of the various parts thereof, as will be hereinafter more fully set forth and specifically claimed.

The principal object of my invention is to afford a cheese-hoop which shall be simple and inexpensive in construction, strong and durable, and so made that it will produce a rectangular-shaped cheese or cake having marks or indentations so arranged on the surface of the cheese as to indicate to the retailer the proper place to cut it in order to obtain approximately a given amount in weight.

Another important object of the invention is to so construct the main section or portion of the hoop and sometimes the follower that in forming the indentations in the cheese the projections for said purpose will act as drains for more effectually removing the whey and other fermentative liquids or qualities from the curd, thus enabling a much firmer and better-keeping cheese to be made.

A further object of the invention is to construct the main portion of the hoop and its ribs or projections to form the indentations in the cheese integrally and so that it may be easily and thoroughly cleansed.

Other objects and advantages will be disclosed in the subjoined description and explanation.

In order to enable others skilled in the art to which my invention pertains to make and use the same, I will now proceed to describe it, referring to the accompanying drawings, in which—

Figure 1 is a fragmental perspective view of a cheese-hoop embodying my invention, showing the various parts thereof in the position they will occupy when the curd shall have been pressed. Fig. 2 is a plan view of the blank out of which the main portion of the hoop is formed. Fig. 3 is a detached perspective view of the bandage-holder. Fig. 4 is a top plan view of the follower. Fig. 5 is a bottom plan view thereof. Fig. 6 is an edge view of the same. Figs. 7, 8, and 9 are perspective views of a portion of the main part of the hoop, showing different forms of the ribs used to form the indentations or depressions in the cheese. Fig. 10 is a perspective view of a detachable piece to be sometimes used within the main part of the hoop, and Fig. 11 is an edge view of the bottom piece.

Similar letters refer to like parts throughout the different views of the drawings.

A represents the main portion of the hoop, which is preferably made of sheet metal and rectangular in shape, as is shown in Fig. 1 of the drawings. This main portion or section of the hoop is preferably made of a rectangular piece or blank A', (see Fig. 2,) formed or struck up so as to produce a series of ribs $a$, extending the entire length thereof. These ribs are angular in cross-section and are each provided with a series of openings $a'$, through which the whey and liquids from the curd may pass. The corners of the blank A are formed with angular recesses $a^2$, so that the edge portions of the blank may be turned up to form the walls of the main portion of the hoop, in which operation the angular flaps $a^3$ may be secured to the walls, which they overlap, by means of rivets $a^4$ or solder, thus producing a square or rectangular-shaped main portion of the hoop. Secured to the upper part of the main portion A is another section B, preferably of sheet metal and of a size and form to correspond with the main or lower portion A, which is slightly flaring toward its top or open portion. It will be observed by reference to Fig. 1 that the bottom of the portion A is provided with other perforations or openings $a^5$ besides those $a'$ in the ribs $a$ for the purpose of drainage.

Secured on the outer surface of the hoop at or about the juncture of the portions A and B is a reinforcing rib or strip $b$, which also serves as a stop for the telescopic movement of the hoop in a fellow hoop, as will be presently explained.

C represents the follower, which is applied to the top of the curd preparatory to expressing the whey therefrom. This follower is preferably formed with grooves $c$ on its upper or outer surface and perforations $c'$ communicating therewith to allow of a free escape of the whey at the upper end of the hoop. The lower surface of the follower C is sometimes provided with ribs $c^2$, arranged so as to register with the ribs $a$ on the main portion A of the hoop. The ribs $c^2$ on the follower are preferably angular in cross-section and hollow and usually provided with perforations $a'$ for the passage of whey from the curd.

D denotes the bandage-holder, which is preferably made of a continuous piece of a size and form to fit snugly within the upper portion B of the hoop and has near one of its ends a pivoted clamp $d$ to unite said ends and also to fasten the bandage-cloth on the holder.

Instead of forming the main portion A and the ribs $a'$ integrally therewith and out of a blank in the manner above set forth said main portion may be otherwise suitably made, and ribs or projections of any desired shape to form the indentations in the surface of the cheese may be secured thereto in parallelism in any suitable manner without departing from the spirit of my invention.

In Figs. 8 and 9 I have shown two modifications in the construction of the ribs and in the manner of securing them to the main portion of the hoop, which in the first instance consists of an angular or V-shaped rib $e$, having perforations communicating with its cavity and as being soldered to the main portion, while in Fig. 9 I have shown a perforated hollow tube $e'$ similarly secured to the main portion; but it is evident that I may rivet or otherwise fasten them to said portion. It is obvious that the ribs $c^2$ on the follower C may be omitted; but when they are employed they may be of any desired shape and suitably fastened to the follower or in some instances made integral therewith.

From the foregoing and by reference to the drawings it will be seen and readily understood that with my improved cheese-hoop the usual mode of operation in forming cheese may be carried out—that is to say, a cap-cloth is placed in the bottom of the hoop and the bandage-cloth $d'$, and its holder D is placed in position in the upper portion of the hoop in the well-known manner, but so as to cover the walls of the hoop and to rest somewhat on the bottom thereof. The curd is then placed in the hoop and another cap-cloth is applied to the top of the curd, and the follower is then placed upon the top cap-cloth. A number of hoops being thus prepared for the press, the first is placed with its main or lower portion against the end of the press opposite the head-block on the end of the plunger or screw of the press, and then the remainder of the hoops are successively placed with their main or lower ends into the preceding hoops. When all the hoops are thus arranged in the press frame or bed, the screw is applied. The hoops being allowed to move telescopically within one another, the pressure is transmitted from the first hoop throughout the entire series of hoops and the process of pressing complete in one operation. In this operation it is apparent that the ribs on the main portion of the hoop and those on the follower when used, which should be placed in alinement with the hoop-ribs, will be embedded to some extent in the curd, and as these ribs are usually hollow and perforated, as above stated, they will more effectually extract the whey and fermentative substances from the curd than if they were not used, besides at the same time providing the cheese with indicating marks or indentations which may be so arranged as to enable the retailer to cut off approximately a given quantity of the cheese, thus preventing waste and saving the time and trouble of weighing the same. When the main portion A and its ribs $a$ are formed integrally, it is evident that said ribs being struck up, as is more clearly shown in Fig. 7, will form channels or conduits through which the whey may flow, and by placing the hoops in the gang-press so that the ribs will be in a vertical position it is evident that the discharge of whey through said channels will be perfect on account of the taper or flaring shape of the hoop. After the pressing process the cheeses may be easily removed from their respective hoops, as is apparent.

While I have shown the walls and bottom of the main portion of the hoop provided with ribs, yet I may sometimes omit them from one or both of the walls and use them on the bottom, or I may omit them from the bottom and use them on one or both of the walls, and in either instance the follower may be used with or without the ribs thereon.

Instead of forming the main portion A of the hoop with the ribs of the various constructions above mentioned I may make it without them and use a separate piece $A^2$ (see Fig. 10) for forming the marks or indentations on the walls of the cheese and another separate piece $A^3$ (see Fig. 11) for forming them on the bottom. The piece $A^2$ is made of a single piece and while straight is formed with the ribs $a$ so that they will be on any or all of its walls when formed into a rectangular shape and form to fit snugly within the main portion of the hoop. The ribs $a$ on the pieces $A^2$ and $A^3$ may be of any desired shape and construction and may be made integral therewith or suitably secured thereto in any desired manner. The piece $A^3$ when used is placed in the bottom of the main portion and the piece $A^2$ on the inner surface of its walls, which can be readily done, for the reason its ends are not united and it can be easily sprung into place. It is evident these pieces can be more easily and cheaply made than the main portion with ribs and that the same effect will be produced.

Having thus fully described my invention, what I claim as new, and desire to secure by Letters Patent, is—

1. A cheese-hoop comprising a rectangular-shaped main portion and a series of hollow and perforated ribs located on the inner surface of its bottom and walls, substantially as described.

2. A rectangular cheese-hoop having on its inner surface a series of hollow and perforated ribs, substantially as described.

3. A cheese-hoop comprising a rectangular-shaped main portion struck up and having formed integrally therewith a series of perforated ribs, substantially as described.

EDWARD J. PIGGOTT.

Witnesses:
CHAS. C. TILLMAN,
A. GUSTAFSON.